US008223953B2

(12) United States Patent
Houmaidi et al.

(10) Patent No.: US 8,223,953 B2

(45) Date of Patent: Jul. 17, 2012

(54) METHODS, SYSTEMS, AND COMPUTER PROGRAM PRODUCTS FOR RULE-BASED DIRECTION OF CUSTOMER SERVICE CALLS

(75) Inventors: Mounire El Houmaidi, Atlanta, GA (US); Shankaran Narayanan, Alpharetta, GA (US); Homayoun Torab, Snellville, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1299 days.

(21) Appl. No.: 11/601,400

(22) Filed: Nov. 17, 2006

(65) Prior Publication Data

US 2008/0118052 A1 May 22, 2008

(51) Int. Cl.
*H04M 3/00* (2006.01)

(52) U.S. Cl. ......... 379/265.01; 379/265.02; 379/266.01; 379/266.02

(58) Field of Classification Search . 379/265.01–266.08
See application file for complete search history.

(56) References Cited

U.S. PATENT DOCUMENTS 4,737,983 A 4/1988 Frauenthal et al.
5,036,535 A 7/1991 Gechter et al.
5,062,103 A 10/1991 Davidson et al.
5,073,890 A 12/1991 Danielsen
5,168,515 A 12/1992 Gechter et al.
5,249,221 A 9/1993 Ketring
5,249,223 A 9/1993 Vanacore
5,253,288 A 10/1993 Frey et al.
5,271,058 A 12/1993 Andrews et al.
5,291,551 A 3/1994 Conn et al.
5,392,345 A 2/1995 Otto
5,459,780 A 10/1995 Sand
5,724,419 A * 3/1998 Harbuziuk et al. ...... 379/266.04
5,920,621 A 7/1999 Gottlieb
7,382,773 B2 * 6/2008 Schoeneberger et al. ..... 370/353
2001/0040887 A1 * 11/2001 Shtivelman et al. .......... 370/352
2002/0163422 A1 * 11/2002 Eggers ......................... 340/7.29
2005/0084082 A1 * 4/2005 Horvitz et al. ........... 379/114.06
2005/0195964 A1 * 9/2005 Hahn et al. ............... 379/265.02
2006/0262922 A1 * 11/2006 Margulies et al. ....... 379/265.12
2007/0003050 A1 * 1/2007 Ebling et al. ............. 379/265.02
2007/0025542 A1 * 2/2007 Bushey .................... 379/265.02

* cited by examiner

*Primary Examiner* — Ahmad Matar
*Assistant Examiner* — Oleg Asanbayev
(74) *Attorney, Agent, or Firm* — Cantor Colburn LLP

(57) ABSTRACT

Directing customer service calls based upon one or more rules incorporating customer information, network status information, service status information, or various combinations thereof. An incoming service call, and a customer identifier for the incoming service call are received. The customer identifier is used to obtain customer information. Network status information is obtained, or service status information is obtained, or network status information and service status information are obtained. One or more rules are retrieved. The one or more retrieved rules are applied to at least one of the obtained network status information or the obtained service status information to automatically direct the incoming call to a help desk agent selected from a plurality of help desk agents.

12 Claims, 2 Drawing Sheets

NETWORK STATUS INFORMATION DATABASE
101
RULES DATABASE
105
RULES APPLICATION SERVER
109
FIRST HELP DESK AGENT
117
CALL DIRECTION MECHANISM
111
SECOND HELP DESK AGENT
119
SERVICE STATUS INFORMATION DATABASE
103
CUSTOMER INFORMATION DATABASE
107
COMMUNICATIONS NETWORK
113
THIRD HELP DESK AGENT
121
CUSTOMER PREMISES EQUIPMENT
115

METHODS, SYSTEMS, AND COMPUTER PROGRAM PRODUCTS FOR RULE-BASED DIRECTION OF CUSTOMER SERVICE CALLS

BACKGROUND

The present disclosure relates generally to customer service call direction, and more particularly, to methods, systems, and computer program products for rule-based direction of customer service calls.

Customer service calls may be generated in response to customers experiencing any of a broad range of problems. These problems may be attributable to malfunctioning customer premises equipment, equipment that is not properly connected, a failure at the service provider, a communications network outage, various combinations thereof, or other factors not specifically enumerated. Upon receipt of an incoming call at a service center, the call is screened using a sequence of automated voice prompts and then routed to a pool of first-tier help desk agents. If the problem is not resolved by a first-tier agent, the service call is then redirected to a pool of second-tier help desk agents. Irrespective of the nature of the problem, all incoming service calls are routed through the first-tier agent. Customers must speak with first-tier agents in situations where the customer has called previously regarding an as-yet-unresolved issue, and also in situations where the customer is experiencing a recurring problem. These calls may lead to frustration and customer dissatisfaction.

In view of the foregoing, there is a need in the art for improved methods and systems which do not automatically screen and route all incoming service calls to a first-tier help desk agent, but rather direct these calls to an appropriate agent in accordance with problem status and customer information.

SUMMARY

Embodiments include methods for directing customer service calls based upon one or more rules incorporating customer information, network status information, service status information, or various combinations thereof. An incoming service call, and a customer identifier for the incoming service call are received. The customer identifier is used to obtain customer information. Network status information is obtained, or service status information is obtained, or network status information and service status information are obtained. One or more rules are retrieved. The one or more retrieved rules are applied to at least one of the obtained network status information or the obtained service status information to automatically direct the incoming service call to a help desk agent selected from a plurality of help desk agents.

Embodiments further include computer program products for implementing the foregoing methods.

Additional embodiments include a system for directing customer service calls based upon one or more rules incorporating customer information, network status information, service status information, or various combinations thereof. A call direction mechanism is capable of receiving an incoming service call and a customer identifier for the incoming service call. The call direction mechanism is operatively coupled to a rules application server. A rules database, a customer information database, and at least one of a network status information database or a service status information database, are operatively coupled to the rules application server. The rules application server uses the customer identifier to obtain customer information from the customer information database. The rules application server obtains network status information from the network status information database, or obtains service status information from the service status information database, or obtains network status information from the network status information database and service status information from the service status information database. The rules application server retrieves one or more rules from the rules database. The rules application server applies one or more retrieved rules to at least one of the obtained network status information or the obtained service status information to control the call direction mechanism to automatically direct the incoming call to a help desk agent selected from a plurality of help desk agents.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains exemplary embodiments of the invention, together with advantages and features, by way of example with reference to the drawings.

DETAILED DESCRIPTION OF EXEMPLARY EMBODIMENTS

Figure 1:
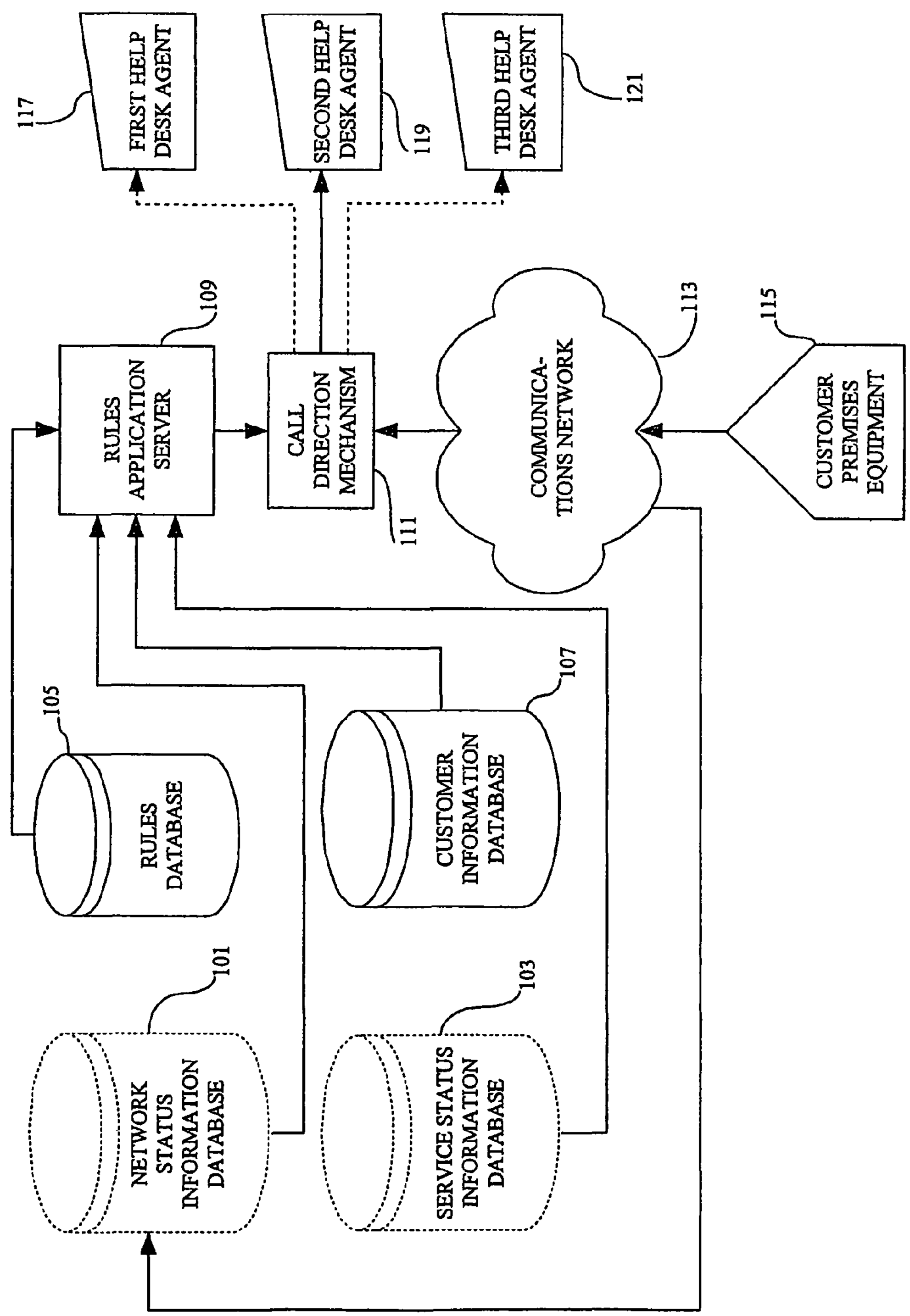
FIG. 1 shows an illustrative system for rule-based direction of customer service calls.

FIG. 1 depicts a system for providing rule-based direction of customer service calls. A call direction mechanism 111 is capable of receiving an incoming service call and a customer identifier for the incoming service call. The incoming service call is received over a communications network 113. The service call may be placed using an item of customer premises equipment 115 such as a telephonic device, wireless device, or equipment capable of voice over internet protocol (VoIP) communications such as a personal computer, laptop computer, personal digital assistant, internet protocol television (IPTV) equipment, or media presentation device. Customer premises equipment 115 receives any of various communication services such as telephonic service, wireless access, Internet access, or the like from communications network 113. Alternatively or additionally, the incoming service call may be placed by a telephonic device, wireless device, or VoIP-capable equipment that is operatively coupled to communications network 113 but not physically situated at a customer premises.

Communications network 113 may be implemented using any of a variety of networks and network components including, but not limited to, routers, switches, servers, the public switched telephone network (PSTN), the Internet, a cable television network, a wireless network, a satellite communications network or the like, as well as various combinations thereof. These networks and network components are equipped to communicate using one or more protocols which, for purposes of illustration, could but need not include digital subscriber line (DSL), Internet protocol (IP), WiFi (IEEE 802.11), or WiMax (IEEE 802.16). For example, one illustrative implementation for communications network 113 may include the PSTN providing voice and broadband services over a DSL connection to customer premises 115.

Call direction mechanism 111 is operatively coupled to a rules application server 109. Call direction mechanism 111 may be implemented using any device that is capable of connecting an incoming call to a help desk agent selected by rules application server 109 from a plurality of help desk agents. For example, call direction mechanism 111 may represent one or more private branch exchange (PBX) switches, a router programmed to route incoming VoIP calls, an email server, an instant messaging server, or various combinations thereof.

Rules application server 109 may be implemented using servers or general purpose computers capable of executing computer programs that perform the processes described herein. Rules application server 109 is capable of controlling call direction mechanism 111, and is also capable of accessing one or more databases as will be described in greater detail hereinafter. Although the configuration of FIG. 1 shows rules application server 109 and call direction mechanism 111 as two separate elements, this is for illustrative purposes only as a single element, such as a server or general purpose computer, can be used to implement both rules application server 109 and call direction mechanism 111.

As stated previously, call direction mechanism 111 connects an incoming call to a help desk agent selected from a plurality of help desk agents. These help desk agents may include a first help desk agent 117, a second help desk agent 119, and a third help desk agent 121. First, second, and third help desk agents 117, 119, 121 may each represent one or more communication devices used by human help desk operators, such as telephone handsets, computer terminals, or both. Alternatively or additionally, first, second, and third help desk agents 117, 119, 121 may each represent automated computerized help desk agents or bots.

A bot (short for "robot") is a program that operates as an agent for a user by simulating a human activity. A chatterbot is a program that can simulate talk with a human being. For example, "Red" and "Andrette" are the names of two chatterbot programs that may be customized to answer questions from customers seeking assistance in connection with a product or service. Chatterbot programs are sometimes referred to as virtual representatives or virtual service agents.

Illustratively, first help desk agent 117 has expertise in a first area, second help desk agent 119 has expertise in a second area, and third help desk agent 121 has expertise in a third area. For example, first help desk agent 117 may be capable of answering questions related to customer problems in accessing a designated website over the Internet. Second help desk agent 119 may be capable of answering questions pertaining to package deliveries, and help desk agent 121 may be capable of answering questions related to internet protocol television (IPTV). These areas of expertise are presented only for explanatory purposes.

The databases accessed by rules application server 109 may be provided in the form of a rules database 105, a customer information database 107, an optional network status information database 101, and an optional service status information database 103. Other databases not shown may be used, and not all of the databases that are shown are required. Network status information database 101, service status information database 103, customer information database 107, and rules database 105 may each be implemented using devices that are separate from rules application server 109 as shown in FIG. 1. Additionally or alternatively, one or more of these databases 101, 103, 105, 107 may be implemented in the form of memory within rules application server 109, or one or more of these databases 101, 103, 105, 107 may be integrated into a single data storage drive.

Rules application server 109 uses a customer identifier received over communications network 113 to obtain customer information from customer information database 107. This customer identifier may, for example, include caller ID information retrieved from an incoming customer service call, identifying information entered into customer premises equipment 115 by a customer seeking service, identifying information retrieved from customer premises equipment 115, or any of various combinations thereof.

Customer information database 107 associates each of a plurality of customer identifiers for identifying a customer with information pertaining to that customer. A customer identifier is any numeric, alphanumeric or alphabetic indicia that serves to uniquely identify each of a plurality of customers. Customer information database 107 may include information specifying a customer's service history such as how many times a customer has placed a service call within a given time period and how many of these service calls pertained to the same problem. Customer information database 107 may, but need not, include a satisfaction level parameter indicative of customer satisfaction relative to other customers, as well as a business level parameter indicative of the relative importance of that customer to the business providing service support. For example, a customer who purchases bundled services from a business may be entitled to a higher level of service than a customer who only purchases a single service.

Customer information database 107 may, but need not, include information identifying one or more devices included in customer premises equipment 115, as well as hardware configuration information for these devices, the geographic location of customer premises equipment 115, and a current operational status for one or more of these devices. Information identifying one or more devices may be provided in the form of one or more serial numbers identifying these devices. Optionally, customer information database 107 may include an address setting forth the physical location of customer premises equipment 115, coordinates setting forth the geographic location of customer premises equipment 115, customer premises equipment 115 software data such a version number for a boot read only memory (ROM) employed by customer premises equipment 115. Optionally, customer information database 107 may set forth an operating system version for software used by one or more identified devices, a globally unique identifier (GUID) for a device, or a phone number associated with a user of customer premises equipment 115. Customer information database 107 may include other information not described above, and/or some or all of the described information may not be utilized in specific system applications.

If a customer experiences a problem that results in a service call being placed, a record of the call is stored in the form of a trouble event record in customer information database 103. Each trouble event record associates a customer identifier with a corresponding timestamp and corresponding trouble code parameters or key words. A timestamp provides an indication of a time at which a service call was received. Trouble code parameters or key words are illustratively provided in the form of numeric, alphabetic, or alphanumeric codes assigned to each of a plurality of issue categories, such as difficulties connecting to communications network 113, inability to receive package tracking information on an Internet website, inability to receive streamed video on a customer endpoint device, failure to access an Internet website, and others. Alternatively or additionally, trouble code parameters or key words may be provided in the form of one or more key words that are descriptive of a given service issue or category of service issues.

Network status information database 101 includes information about the current operational status of communications network 113, including any network failures or outages. Network information database 101 may optionally include one or more communication parameters such as basic diagnostic information regarding customer premises equipment 115, sync rate, port statistics, an IP address assigned to a DSL modem router included in customer premises equipment 115, or a static IP address associated with customer premises equipment 115. In this manner, customer problems caused by temporary network outages or failures may be identified.

The current operational status of communications network 113 may specify, for example, whether or not there are any current equipment outages, broken communication pathways, capacity issues, or other problems with communications network 113. Operational status information may be organized in the form of an event list associating each of a plurality of event times with a corresponding failure event descriptor, a corresponding time of event resolution, and a corresponding geographic identifier. Event times may indicate a time at which a failure event was first observed or detected. Event times may also indicate a time at which the failure event was resolved or corrected. Event descriptors may be provided in the form of alphabetic, alphanumeric or numeric codes assigned to each of a plurality of failure categories, such as server outages, broken communication pathways, or the like. A geographic identifier sets forth one or more locations for the failure event, illustratively in the form of a geographic description, X-Y coordinates, latitude and longitude, an IP address, or the like. These failures could, but need not, occur within communications network 113. For example, one illustrative failure event is a server outage in Cleveland, Ohio.

Service status information database 103 includes information about the current operational status of a service to be provided to a customer. For example, a customer wishes to track a package that has been shipped, or wishes to book an international flight on a travel-based website. Accordingly, service status information database 103 may indicate that all package shipments to Denver have been suspended due to a major snowstorm, or that the travel-based website is down.

Rules application server 109 obtains network status information from network status information database 101, or obtains service status information from service status information database 103, or obtains network status information from network status information database 101 and service status information from service status information database 103. Rules application server 109 then retrieves one or more rules from rules database 105. Rules application server 109 applies one or more retrieved rules to at least one of the obtained network status information or the obtained service status information to control call direction mechanism 111 to automatically direct the incoming call to a help desk agent selected from a plurality of help desk agents such as first, second, and third help desk agents 117, 119, and 121.

Optionally, customer premises equipment 115 may include a remote diagnostic application program interface (API) that collects operational status information for customer premises equipment 115 in real time and sends the diagnostic information over communications network 113 to rules application server 109 on a periodic, recurring, or predetermined basis. For example, the diagnostic API may send diagnostic information at predetermined intervals (e.g., every N minutes), or upon the detection of a change in operational status of customer premises equipment 115, or both. For example, a change in operational status may include upgrading a software operating system of customer premises equipment 115, or detecting a new hardware device added to customer premises equipment 115. Rules application server 109 receives diagnostic information from the diagnostic API and stores this information in customer information database 107.

Optionally, rules application server 109 executes an operating system (e.g., Microsoft Windows, OS/2, or the like) that provides a software environment for executing other applications. A web browser may be employed to provide access to rules application server 109 over communications network 113. In this manner, rules application server 109 executes a web server application that permits access to rules database 105, service status information database 103, network status information database 101, and customer information database 107 via a web interface. This web interface permits rules application server 109 to provide at least one of a first customer help desk agent 117, second help desk agent 119, or third help desk agent 121 with access to data retrieved from databases 101, 103, 105, or 107 over communications network 113. Optionally, rules application server 109 may organize data retrieved from databases 101, 103, 105, 107 in the form of a template, so as to facilitate assistance rendered by at least one of first customer help desk agent 117, second help desk agent 119, or third help desk agent 121

One or more rules are stored in rules database 105. These rules specify routing of a call based upon one or more factors including, for example, any of: (a) time of receipt of a customer service call, (b) current waiting times for each of a plurality of help desk agents, (c) average waiting times for each of a plurality of call centers at which help desk agents are available, (d) the customer identifier, (e) a customer's service history including the number of times a customer has placed a service call within a given time period, or the number of previous service calls pertaining to the same problem as the present service call, or both, (f) a customer satisfaction parameter indicative of a customer satisfaction level relative to other customers, (g) a business level parameter indicative of a customer importance level to a business providing service support relative to customer importance levels of other customers, (h) available help desk agent capacity at each of a plurality of call centers, (i) execution of a remote diagnostics program for diagnosing customer premises equipment 115, (j) a call center data map that identifies center-specific information, (k) past performance of specific help desk agents or call centers in solving specific problems, (l) current active calls at each of a plurality of call centers, (m) geographic location or time zone for each of a plurality of call centers, (n) areas of expertise for each of a plurality of help desk agents or call centers, (o) one or more rules that are defined by a customer service provider, or (p) various combinations thereof.

A set of rules to be implemented by rules application server 109 can be defined or specified by a customer service provider. These rules may govern service call mapping between call centers, customer problems, and diagnostic information. A default rule may be formulated by a customer service provider for the purpose of reducing total customer wait time. A set of emergency redirect rules may be formulated and dynamically modified in situations where a new call center is to be added, or an existing call center is disabled due to a natural disaster or political unrest. A set of call escalation rules may be provided for customers who have a high number of previous service calls relative to other customers, or who have a high customer importance level relative to other customers, or both. In this manner, important customers or customers who have a recurring problem will be routed to an appropriate help desk agent more quickly than customers who are not as important or who do not have recurring problems.

Rules database 105 also includes data pertaining to each of a plurality of help desk agents, such as first, second, and third help desk agents 117, 119, 121, or each of a plurality of call centers wherein each call center includes one or more help desk agents. Each help desk agent may be identified by a corresponding help desk agent identifier. Similarly, each call center may be identified by a corresponding call center identifier. Rules database 105 may associate each of a plurality of help desk agent identifiers or service center identifiers with one or more corresponding trouble code parameters or key words indicative of an issue or issue category related to a product or service. Association of a help desk agent identifier or customer service center identifier with one or more trouble code parameters or key words signifies that this customer service center or help desk agent has expertise in resolving communication service issues related to the identified trouble code parameters or key words, or that this customer service center or help desk agent is capable of facilitating resolution of service issues related to the identified trouble code parameters or key words.

Pursuant to one illustrative example, rules application server 109 may direct a call to a selected help desk agent of first, second, and third help desk agents 117, 119, 121 by using rules database 105 to determine which of a plurality of help desk agents is capable of facilitating resolution of a given service issue. This determination is made using data retrieved from one or more databases 101, 103, 105, 107. For example, resolution of the issue may be facilitated by comparing one or more trouble code parameters or key words for a given customer premises equipment 115 stored in customer information database 107 with one or more trouble code parameters or key words stored in network status information database 101 or service status information database 103 to identify any matching trouble code parameters or key words. A call is routed to a help desk agent 117, 119, or 121 by selecting a help desk agent having at least one trouble code parameter or key word associated therewith in rules database 105 which matches at least one trouble code parameter or key word associated with the given customer premises equipment 115 in customer information database 107. Alternatively or additionally, a call is routed to a help desk agent 117, 119, 121 by selecting an agent having a maximum number of trouble code parameters or key words associated therewith matching a maximum number of trouble code parameters or key words associated with the given customer premises equipment 115.

Figure 2:
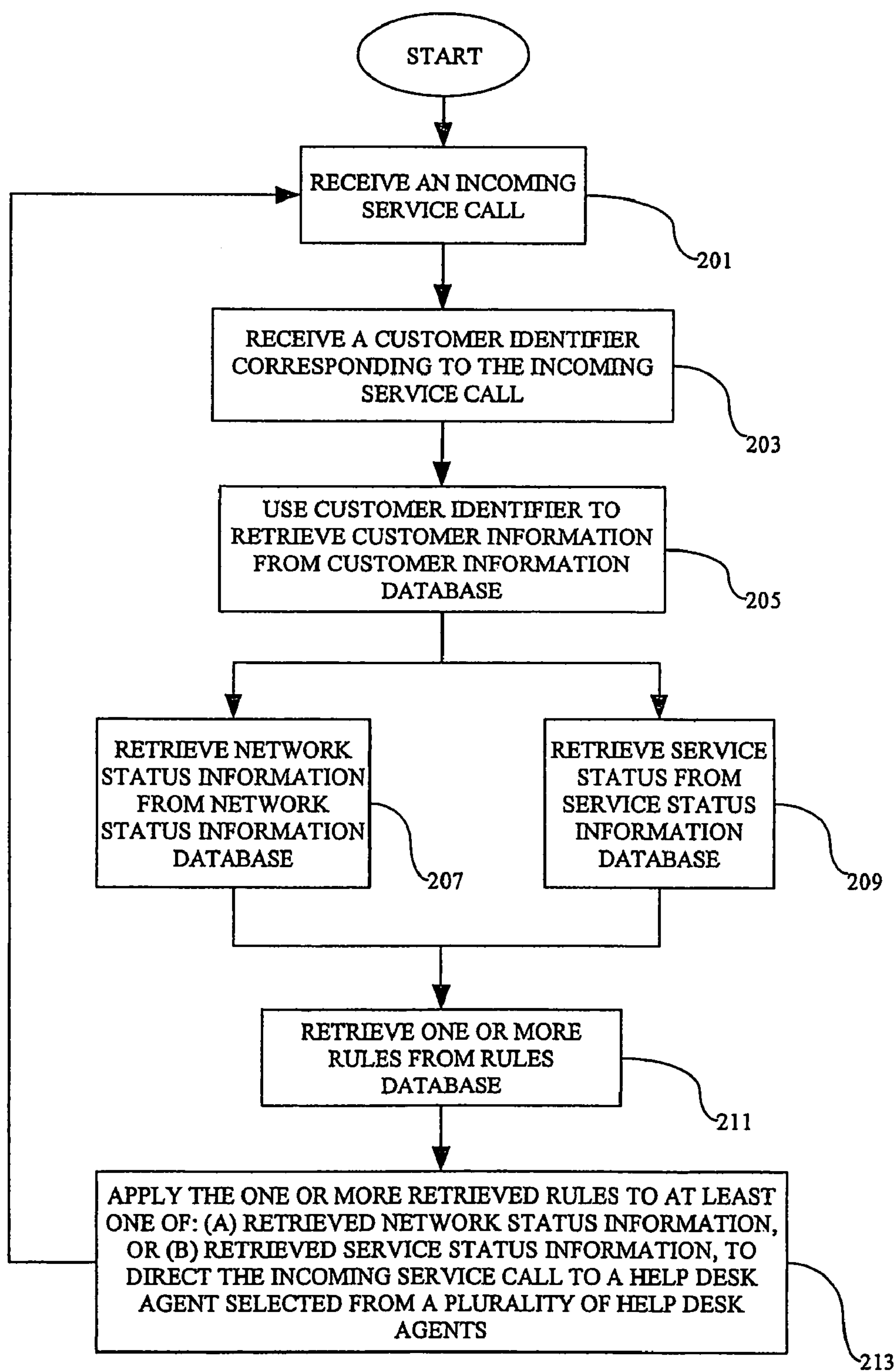
FIG. 2 shows an illustrative method for providing rule-based direction of customer service calls.

FIG. 2 shows an illustrative method for providing rule-based direction of customer service calls. The procedure commences at block 201 where an incoming service call is received. The call may be received, for example, over communications network 113 (FIG. 1) from customer premises equipment 115. Next, at block 203 (FIG. 2), a customer identifier corresponding to the incoming service call is received. The customer identifier may be provided in the form of caller ID information received from communications network 113 (FIG. 1), or in the form of information entered into customer premises equipment 115 by a customer, or both.

At block 205 (FIG. 2), the customer identifier is used to retrieve customer information from customer information database 107 (FIG. 1). Next, the procedure progresses to block 207 or block 209 (FIG. 2). One or both of blocks 207 and 209 may be performed and, if both blocks are performed, they can be performed simultaneously or in any order. At block 207, network status information is retrieved from network status information database 101 (FIG. 1). At block 209 (FIG. 2), service status information is retrieved from service status information database 103 (FIG. 1).

After any of blocks 207 and 209 (FIG. 2) have been performed, the procedure progresses to block 211 where one or more rules are retrieved from rules database 105 (FIG. 1). At block 213, one or more retrieved rules are applied to at least one of the retrieved network status information or the retrieved service status information to direct the incoming service call to a help desk agent selected from a plurality of help desk agents 117, 119, 121 (FIG. 1).

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for directing customer service calls based upon rules incorporating customer information, network status information and service status information, the method comprising:

receiving an incoming service call and a customer identifier for the incoming service call;

obtaining customer information using the customer identifier;

obtaining network status information including current operational status of a communications network providing services to a customer initiating the incoming service call, the current operational status identifying problems in the communications network disrupting services to the customer;

obtaining service status information;

retrieving the rules;

applying the rules to the network status information and the service status information to direct the incoming service call to a help desk agent selected from a plurality of help desk agents;

wherein the rules assign a higher priority to the incoming service call if the incoming service call is from a customer who has a high customer importance level relative to other customers, and a lower priority to other incoming service calls, and wherein the customer importance level is determined by a customer spending level;

wherein the rules assign a higher priority to the incoming service call if the incoming service call is from a customer having a greater number of previous service calls relative to other customers, and a lower priority to other incoming service calls;

wherein a higher priority incoming service call is directed to the help desk agent more rapidly than lower priority incoming service calls;

wherein the rules specify routing of the incoming service call based upon factors including (a) time of receipt of the incoming service call, (b) current waiting times for each of the plurality of help desk agents, (c) average waiting times for each of a plurality of call centers at which help desk agents are available, (d) the customer identifier, (e) a customer's service history including a number of times a customer has placed a service call within a given time period and a number of previous service calls pertaining to a same problem as a present service call, (f) a customer satisfaction parameter indicative of a customer satisfaction level relative to other customers, (g) a business level parameter indicative of a customer importance level to a business providing service support relative to customer importance levels of other customers, (h) available help desk agent capacity at each of the plurality of call centers, (i) execution of a remote diagnostics program for diagnosing customer premises equipment, (j) a call center data map that identifies center-specific information, (k) past performance of specific help desk agents and call centers in solving specific problems, (l) current active calls at each of the plurality of call centers, (m) geographic location and time zone for each of the plurality of call centers, and (n) areas of expertise for each of the plurality of help desk agents and call centers.

2. The method of claim 1 further including obtaining diagnostic information pertaining to a customer problem, wherein the rules specify service call mapping to the help desk agent selected from the plurality of help desk agents based upon the diagnostic information.

3. The method of claim 1 wherein the rules specify directing the incoming service call to the help desk agent selected from the plurality of help desk agents so as to reduce total customer wait time.

4. The method of claim 1 wherein the rules include a set of emergency redirect rules that are dynamically modified if help desk agents are not accessible due to a system failure.

5. A non-transitory tangible computer readable storage medium for directing customer service calls based upon rules incorporating customer information, network status information and service status information, the non-transitory tangible computer readable storage medium storing instructions for execution by a processing circuit for facilitating a method comprising:

receiving an incoming service call and a customer identifier for the incoming service call;

obtaining customer information using the customer identifier;

obtaining network status information including current operational status of a communications network providing services to a customer initiating the incoming service call, the current operational status identifying problems in the communications network disrupting services to the customer;

obtaining service status information;

retrieving the rules;

applying the rules to the network status information and the service status information to direct the incoming service call to a help desk agent selected from a plurality of help desk agents;

wherein the rules assign a higher priority to the incoming service call if the call is from a customer who has a high customer importance level relative to other customers, and a lower priority to other incoming service calls, wherein the customer importance level is determined by a customer spending level;

wherein the rules assign a higher priority to the incoming service call if the incoming service call is from a customer having a greater number of previous service calls relative to other customers, and a lower priority to other incoming service calls;

wherein a higher priority incoming service call is directed to the help desk agent more rapidly than lower priority incoming service calls;

wherein the rules specify routing of the incoming service call based upon factors including (a) time of receipt of the incoming service call, (b) current waiting times for each of the plurality of help desk agents, (c) average waiting times for each of a plurality of call centers at which help desk agents are available, (d) the customer identifier, (e) a customer's service history including a number of times a customer has placed a service call within a given time period and a number of previous service calls pertaining to a same problem as the present service call (f) a customer satisfaction parameter indicative of a customer satisfaction level relative to other customers, (g) a business level parameter indicative of a customer importance level to a business providing service support relative to customer importance levels of other customers, (h) available help desk agent capacity at each of the plurality of call centers, (i) execution of a remote diagnostics program for diagnosing customer premises equipment, (j) a call center data map that identifies center-specific information, (k) past performance of specific help desk agents and call centers in solving specific problems, (l) current active calls at each of the plurality of call centers, (m) geographic location and time zone for each of the plurality of call centers, and (n) areas of expertise for each of the plurality of help desk agents and call centers.

6. The computer program product of claim 5 further including instructions for obtaining diagnostic information pertaining to a customer problem, wherein the rules specify service call mapping to the help desk agent selected from the plurality of help desk agents based upon the diagnostic information.

7. The computer program product of claim 5 further including instructions wherein the rules specify automatically directing the incoming service call to the help desk agent selected from the plurality of help desk agents so as to reduce total customer wait time.

8. The computer program product of claim 5 further comprising instructions wherein the rules include a set of emergency redirect rules that are dynamically modified if help desk agents are not accessible due to a system failure.

9. A system for directing customer service calls based upon rules incorporating customer information, network status information, and service status information; the system including:

a rules application server;

a call direction mechanism operatively coupled to the rules application server receiving an incoming service call and a customer identifier for the incoming service call;

a rules database, a customer information database, a network status information database and a service status information database, all being operatively coupled to the rules application server;

wherein the rules application server obtains customer information from the customer information database using the customer identifier, and obtains network status information from the network status information database and service status information from the service status information database, the network status information including current operational status of a communications network providing services to a customer initiating the incoming service call, the current operational status identifying problems in the communications network disrupting services to the customer;

and wherein the rules application server retrieves the rules from the rules database and applies the rules to the network status information and the service status information to control the call direction mechanism to direct the incoming call to a help desk agent selected from a plurality of help desk agents;

wherein the rules assign a higher priority to the incoming service call if the incoming service call is from a customer who has a high customer importance level relative to other customers, and a lower priority to other incoming service calls, wherein the customer importance level is determined by a customer spending level;

wherein the rules assign a higher priority to the incoming service call if the incoming service call is from a customer having a greater number of previous service calls relative to other customers, and a lower priority to other incoming service calls;

wherein a higher priority incoming service call is directed to the help desk agent more rapidly than lower priority incoming service calls;

wherein the rules specify routing of an incoming service call based upon factors including: (a) time of receipt of the incoming service call, (b) current waiting times for each of the plurality of help desk agents, (c) average waiting times for each of a plurality of call centers at which help desk agents are available, (d) the customer identifier, (e) a customer's service history including a number of times a customer has placed a service call within a given time period and a number of previous service calls pertaining to a same problem as the present service call, (f) a customer satisfaction parameter indicative of a customer satisfaction level relative to other customers, (g) a business level parameter indicative of a customer importance level to a business providing service support relative to customer importance levels of other customers, (h) available help desk agent capacity at each of the plurality of call centers, (i) execution of a remote diagnostics program for diagnosing customer premises equipment, (j) a call center data map that identifies center-specific information, (k) past performance of specific help desk agents and call centers in solving specific problems, (l) current active calls at each of the plurality of call centers, (m) geographic location and time zone for each of the plurality of call centers, and (n) areas of expertise for each of the plurality of help desk agents and call centers.

10. The system of claim 9 wherein the rules application server obtains diagnostic information pertaining to a customer problem, and wherein the rules specify service call mapping to the help desk agent selected from the plurality of help desk agents based upon the diagnostic information.

11. The system of claim 9 wherein the rules specify directing the incoming service call to the help desk agent selected from the plurality of help desk agents so as to reduce total customer wait time.

12. The system of claim 9 wherein the rules include a set of emergency redirect rules that are dynamically modified if help desk agents are not accessible due to a system failure.

* * * * *